United States Patent
Li et al.

(10) Patent No.: US 11,842,164 B2
(45) Date of Patent: Dec. 12, 2023

(54) METHOD AND APPARATUS FOR TRAINING DIALOG GENERATION MODEL, DIALOG GENERATION METHOD AND APPARATUS, AND MEDIUM

(71) Applicant: TENCENT TECHNOLOGY (SHENZHEN) COMPANY LTD, Shenzhen (CN)

(72) Inventors: Zekang Li, Shenzhen (CN); Jin Chao Zhang, Shenzhen (CN); Zeyang Lei, Shenzhen (CN); Fan Dong Meng, Shenzhen (CN); Jie Zhou, Shenzhen (CN); Cheng Niu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 317 days.

(21) Appl. No.: 17/462,193

(22) Filed: Aug. 31, 2021

(65) Prior Publication Data
US 2021/0397797 A1    Dec. 23, 2021

Related U.S. Application Data

(63) Continuation of application No. PCT/CN2020/102760, filed on Jul. 17, 2020.

(30) Foreign Application Priority Data

Aug. 2, 2019  (CN) .......................... 201910713314.9

(51) Int. Cl.
*G06F 40/35* (2020.01)
*G06N 3/045* (2023.01)

(52) U.S. Cl.
CPC ............. *G06F 40/35* (2020.01); *G06N 3/045* (2023.01)

(58) Field of Classification Search
USPC ...................................................... 704/1–504
See application file for complete search history.

(56) References Cited

U.S. PATENT DOCUMENTS

| 11,205,103 B2* | 12/2021 | Zhang | .................... G06N 3/045 |
| 2017/0091171 A1* | 3/2017 | Perez | ..................... G06F 40/35 |

(Continued)

FOREIGN PATENT DOCUMENTS

| CN | 108334497 A | 7/2018 |
| CN | 110008322 A | 7/2019 |
| CN | 110457457 A | 11/2019 |

OTHER PUBLICATIONS

Xiaodong Gu et al., "Dialogwae: Multimodal Response Generation With Conditional Wasserstein Auto-Encoder", International Conference for Learning Representations 2019, 2019, 11 pages.

(Continued)

*Primary Examiner* — Marcus T Riley
(74) *Attorney, Agent, or Firm* — Sughrue Mion, PLLC

(57) ABSTRACT

The disclosure discloses a method and an apparatus for training a dialog generation model, and a dialog generation method and apparatus, and relates to the field of artificial intelligence. The method includes: encoding a context sample to obtain a first latent variable, and recognizing the first latent variable to obtain a prior latent variable; encoding a response sample to obtain a second latent variable; encoding a response similar sample to obtain a third latent variable; performing recognition according to a Gaussian mixture distribution of the first latent variable, the second latent variable, and the third latent variable to obtain a posterior latent variable; and matching the prior latent variable with the posterior latent variable, and performing adversarial training on a dialog generation model.

20 Claims, 9 Drawing Sheets

(56) References Cited

U.S. PATENT DOCUMENTS

| | | | | |
|---|---|---|---|---|
| 2018/0165554 A1* | 6/2018 | Zhang | ................ | G06F 18/2411 |
| 2019/0035387 A1* | 1/2019 | Zitouni | ............... | G10L 15/1815 |
| 2019/0073363 A1* | 3/2019 | Perez | .................... | G06F 16/335 |
| 2019/0197121 A1* | 6/2019 | Jeon | ........................ | G10L 25/51 |
| 2021/0397797 A1* | 12/2021 | Li | .......................... | G06N 3/042 |

OTHER PUBLICATIONS

International Search Report of PCT/CN2020/102760 dated Oct. 21, 2020 [PCT/ISA/210].

Written Opinion of PCT/CN2020/102760 dated Oct. 21, 2020 [PCT/ISA/237].

* cited by examiner

METHOD AND APPARATUS FOR TRAINING DIALOG GENERATION MODEL, DIALOG GENERATION METHOD AND APPARATUS, AND MEDIUM

CROSS-REFERENCE TO RELATED APPLICATION(S)

This application is a continuation application of International Application No. PCT/CN2020/102760, filed Jul. 17, 2020, which claims priority to Chinese Patent Application No. 201910713314.9, filed with the Chinese Patent Office on Aug. 2, 2019, the disclosures of which are incorporated by reference in their entireties.

FIELD

The disclosure relates to the field of artificial intelligence, and in particular, to a method and an apparatus for training a dialog generation model, a dialog generation method and apparatus, and a medium.

BACKGROUND

In the field of artificial intelligence (AI), a dialog system under an open domain has been widely applied to industrial and academic circles. The dialog system can generate diverse and correlated responses. A dialog generation model based on variational auto-encoders (VAEs) generates diverse and correlated responses in a case that contexts of different topics are given.

A training process of the dialog generation model is described by using a dialog Wasserstein auto-encoder (DialogWAE) as an example. First, the DialogWAE obtains a Gaussian mixture distribution through context learning using a prior network, and generates a prior latent variable based on the Gaussian mixture distribution. Similarly, the DialogWAE also obtains another Gaussian distribution through learning of the context and true responses using a posterior network, and generates a posterior latent variable based on the another Gaussian distribution. Finally, the DialogWAE measures a Wasserstein distance between the prior latent variable and the posterior latent variable by using a discriminator, and train the dialog generation model.

The DialogWAE fits a posterior distribution through a simple Gaussian distribution, for example, obtains a variable by sampling a Gaussian distribution, to generate a posterior latent variable. However, the posterior distribution fitted through a simple Gaussian distribution may not be able to capture complex semantics and high variability that are required for generating responses.

SUMMARY

Embodiments of the disclosure provide a method and an apparatus for training a dialog generation model, a dialog generation method and apparatus, and a medium, to capture complex semantics and high variability of a dialog during training. The technical solutions are as follows.

According to one aspect of the disclosure, a method for training a dialog generation model is provided, performed by a computer device, the method including:

acquiring at least one set of training samples, the training samples including a context sample, a response sample, and a response similar sample;

encoding the context sample to obtain a first latent variable, and recognizing the first latent variable to obtain a prior latent variable;

encoding the response sample to obtain a second latent variable, encoding the response similar sample to obtain a third latent variable, and performing recognition according to a Gaussian mixture distribution of the first latent variable, the second latent variable, and the third latent variable to obtain a posterior latent variable; and matching the prior latent variable with the posterior latent variable, and performing adversarial training on a dialog generation model, the response similar sample including a similar sample of a response that is collected according to a context of the response sample, and the context sample including a collected context of the response sample.

According to another aspect of the disclosure, a dialog generation method is provided, performed by a server running a dialog generation model, the dialog generation model being a model trained according to any one of the foregoing methods in the one aspect and the example embodiments thereof, the dialog generation method including:

acquiring a context of a dialog;

invoking the dialog generation model to encode the context of the dialog to obtain a first latent variable;

invoking the dialog generation model to recognize the first latent variable to obtain a prior latent variable;

invoking the dialog generation model to decode a sum of the first latent variable and the prior latent variable, to generate a response dialog; and outputting the response dialog.

According to another aspect of the disclosure, an apparatus for training a dialog generation model is provided, the apparatus including:

at least one memory configured to store program code; and at least one processor configured to read the program code and operate as instructed by the program code, the program code comprising:

acquisition code configured to cause the at least one processor to acquire at least one set of training samples, the training samples including a context sample, a response sample, and a response similar sample;

recognition code configured to cause the at least one processor to encode the context sample to obtain a first latent variable, and recognize the first latent variable to obtain a prior latent variable;

recognition code configured to cause the at least one processor to encode the response sample to obtain a second latent variable, encode the response similar sample to obtain a third latent variable, and perform recognition according to a Gaussian mixture distribution of the first latent variable, the second latent variable, and the third latent variable to obtain a posterior latent variable; and matching code configured to cause the at least one processor to match the prior latent variable with the posterior latent variable, and perform adversarial training on the dialog generation model, the response similar sample including a similar sample of a response that is collected according to a context of the response sample, and the context sample including a collected context of the response sample.

According to another aspect of the disclosure, a dialog generation apparatus is provided, configured to run a dialog generation model, the dialog generation model being a model trained according to any of the foregoing methods in the one aspect and example embodiments, the apparatus including:
  acquisition code configured to cause the at least one processor to acquire a context of a dialog;
  invoking code configured to cause the at least one processor to invoke the dialog generation model to encode the context of the dialog to obtain a first latent variable,
  the invoking code being configured to cause the at least one processor to invoke the dialog generation model to recognize the first latent variable to obtain a prior latent variable; and
  the invoking code being configured to cause the at least one processor to invoke the dialog generation model to decode a sum of the first latent variable and the prior latent variable to generate a response dialog; and
  output code being configured to cause the at least one processor to output the response dialog.

According to another aspect of the disclosure, a terminal is provided, the terminal including:
  a memory; and
  a processor connected to the memory,
  the processor being configured to load and execute executable instructions to implement the method for training a dialog generation model in the one aspect and the example embodiments thereof and the dialog generation method in the another aspect and the example embodiments thereof.

According to another aspect of the disclosure, a computer device is provided, the computer device including:
  a memory; and
  a processor connected to the memory,
  the processor being configured to load and execute executable instructions to implement the method for training a dialog generation model in the one aspect and the example embodiments thereof and the dialog generation method in the another aspect and the example embodiments thereof.

According to another aspect of the disclosure, a non-transitory computer-readable storage medium is provided, storing at least one instruction, at least one program, a code set, or an instruction set, the at least one instruction, the at least one program, the code set, or the instruction set being loaded and executed by a processor to implement the method for training a dialog generation model in the one aspect and the example embodiments thereof and the dialog generation method in the another aspect and the example embodiments thereof.

According to another aspect of the disclosure, a computer program product or a computer program is provided, the computer program product or the computer program including computer instructions, the computer instructions being stored in a computer-readable storage medium. A processor of a computer device reads the computer instructions from the computer-readable storage medium, and the processor executes the computer instructions to cause the computer device to perform the method for training a dialog generation model in the one aspect and the example embodiments thereof and the dialog generation method in the another aspect and the example embodiments thereof.

BRIEF DESCRIPTION OF THE DRAWINGS

In order to describe the technical solutions in the example embodiments of the disclosure more clearly, the following briefly describes the accompanying drawings for describing the example embodiments. The accompanying drawings in the following description merely show some embodiments of the disclosure, and a person of ordinary skill in the art may still derive other accompanying drawings from these accompanying drawings without creative efforts.

DETAILED DESCRIPTION

Figure 1:
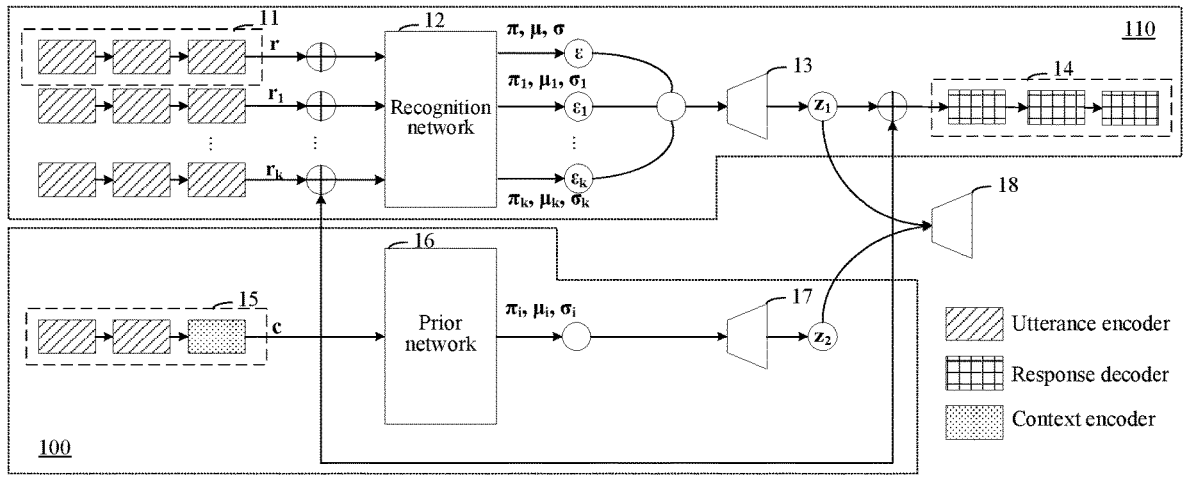
FIG. 1 is a schematic structural diagram of a dialog generation model according to an example embodiment of the disclosure.

To make the objectives, technical solutions, and advantages of the disclosure clearer, implementations of the disclosure are further described below in detail with reference to the accompanying drawings.

First, terms described in the embodiments of the disclosure are briefly introduced.

Artificial intelligence (AI) is a theory, a method, a technology, and an application system that uses a digital computer or a machine controlled by the digital computer to simulate, extend, and expand human intelligence, perceive the environment, acquire knowledge, and use knowledge to obtain the best result. In other words, AI is a comprehensive technology of computer science, which attempts to understand essence of intelligence and produces a new intelligent machine that can respond in a manner similar to human intelligence. AI is to study design principles and implementation methods of various intelligent machines, to enable the machines to have functions of perception, reasoning, and decision-making.

The AI technology is a comprehensive discipline, covering a wide range of fields including both the hardware-level technology and the software-level technology. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, machine learning (ML)/deep learning, and the like.

Natural language processing (NLP) is an important direction in the field of computer science and AI, which studies various theories and methods that can implement effective communication between humans and computers in natural language. NLP is a science that integrates linguistics, computer science and mathematics. Therefore, the research in the field relates to natural languages, that is, languages used by people in daily life, and therefore, NLP is closely related to the study of linguistics. The NLP technology generally includes technologies such as text processing, semantic understanding, machine translation, robot question and answer, and knowledge graph.

ML is a multi-field interdiscipline, involving a plurality of disciplines such as the probability theory, statistics, the approximation theory, convex analysis, and the algorithm complexity theory. The ML specializes in the study of how a computer simulates or implements learning behaviors of humans, to acquire new knowledge or skills, and reorganizes the existing knowledge structure to continuously improve its own performance. The ML is the core of the AI, is a basic way to make the computer intelligent, and is applied to various fields of AI. ML and deep learning generally include technologies such as an artificial neural network, a belief network, reinforcement learning, transfer learning, inductive learning, and learning from demonstrations.

FIG. 1 is a schematic structural diagram of a dialog generation model according to an example embodiment of the disclosure. The dialog generation model includes a prior distribution module 100, a posterior distribution module 110, and a discriminator 18.

The posterior distribution module 110 includes at least two groups of utterance encoders 11, a recognition network 12, a first generator 13, and a response decoder set 14. Each group of utterance encoders 11 of the at least two groups of utterance encoders 11 is connected to the recognition network 12, the recognition network 12 is connected to the first generator 13, and the first generator 13 is connected to the response decoder set 14.

In an example embodiment, each group of utterance encoders 11 includes j utterance encoders connected in series, and the response decoder set 14 includes f response decoders connected in series, j and f being positive integers.

The prior distribution module 100 includes a context encoder set 15, a prior network 16, and a second generator 17. The context encoder set 15 is connected to the prior network 16, and the prior network 16 is connected to the second generator 17, and the context encoder set 15 is further separately connected to each group of utterance encoders 11 and the response decoder set 14.

In an example embodiment, the context encoder set 15 includes at least one utterance encoder and at least one context encoder.

The discriminator 18 is separately connected to the first generator 13 and the second generator 17.

In some embodiments, the at least two groups of utterance encoders 11 include a first encoder set and a second encoder set. The context encoder set 15 is configured to encode a context sample to obtain a first latent variable c. The first encoder set is configured to encode a response sample to obtain a second latent variable r, and the second encoder set is configured to encode a response similar sample to obtain k third latent variables $r_1, \ldots,$ and $r_k$.

The recognition network 12 is configured to recognize a sum r+c of the second latent variable and the first latent variable to obtain one first Gaussian mixture distribution and a corresponding first weight $\pi$, and recognize respective sums $r_1+c, \ldots,$ and $r_k+c$ of the k third latent variables and the first latent variable, to obtain k second Gaussian mixture distributions and corresponding k second weights $\pi_1, \ldots,$ and $\pi_k$. The first Gaussian mixture distribution includes a mean value $\mu$ and a variance $\sigma$, and the second Gaussian mixture distribution includes mean values $\mu_1, \ldots,$ and $\mu_k$ and variances $\sigma_1, \ldots,$ and $\sigma_k$.

The recognition network 12 is further configured to extract a first Gaussian noise c from the first Gaussian mixture distribution, extract second Gaussian noises $\varepsilon_1, \ldots,$ and $\varepsilon_k$ from the second Gaussian mixture distribution, and calculate a posterior Gaussian noise as $\varepsilon*\pi + \varepsilon_1*\pi_1 +, \ldots, +\varepsilon_k*\pi_k$.

The first generator 13 is configured to convert the posterior Gaussian noise into a posterior latent variable $z_1$.

The prior network 16 is configured to recognize the first latent variable c to obtain a third Gaussian mixture distribution and third weights $\pi_i$, where the third Gaussian mixture distribution includes a third Gaussian distribution, and the third Gaussian distribution includes a mean value $\mu_i$ and a variance $\sigma_i$, and calculate a prior Gaussian noise as $\varepsilon_1*\pi_1 +, \ldots, +\varepsilon_i*\pi_i$, k and i being positive integers.

In an example embodiment, the prior network 16 includes a normalized exponential function, where the normalized exponential function is a softmax function. The prior network 16 is further configured to determine the above third weights $\pi_i$ by using the softmax function.

The second generator 17 is configured to convert the prior Gaussian noise into a prior latent variable $z_2$.

The discriminator 18 is configured to perform adversarial training on the dialog generation model by minimizing a transportation distance between $z_1$ and $z_2$, where the transportation distance is a Wasserstein distance.

Based on the above, a training module for the response similar sample is added to the above dialog generation model, and a posterior distribution of a dialog generation model is fitted by using a Gaussian mixture distribution of the similar sample, thereby achieving the purpose of fitting more complex semantics and capturing complex semantics and high variability of a dialog.

The softmax function is also used in the prior network of the above dialog generation model, which avoids a problem that the Gaussian mixture distribution degenerates to a simple Gaussian distribution as a result of the use of a gumbel-softmax function, so that the Gaussian distribution obtained through recognition by the prior network may be maintained as the Gaussian mixture distribution.

Figure 2:
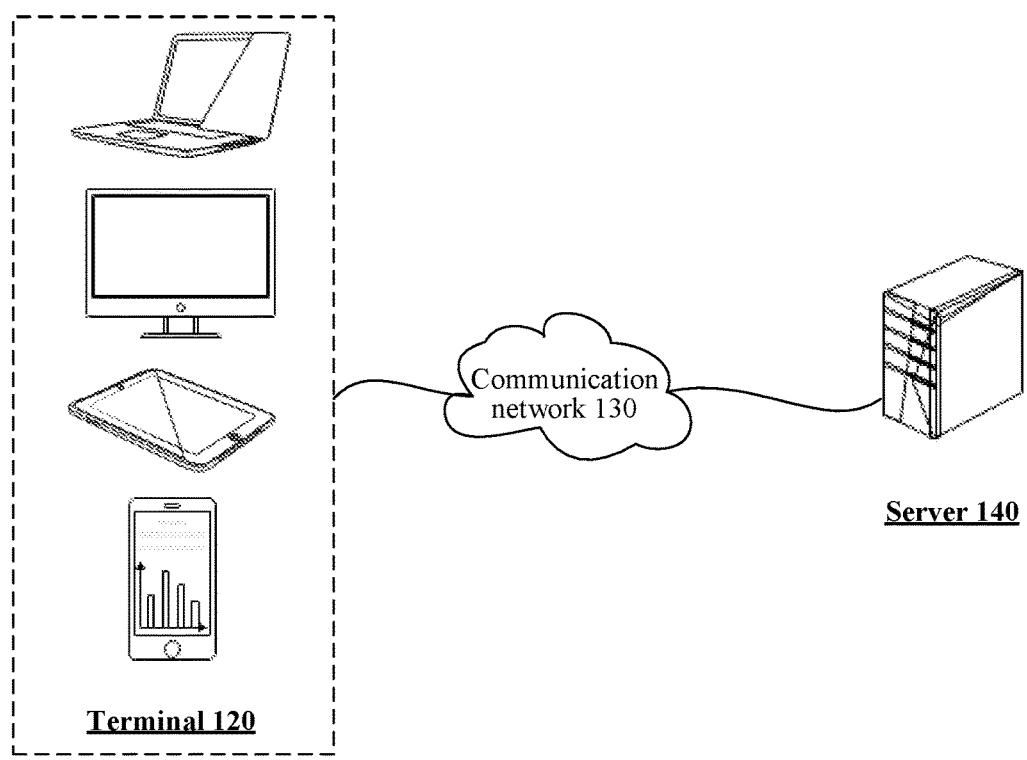
FIG. 2 is a schematic structural diagram of a computer system according to an example embodiment of the disclosure.

FIG. 2 is a schematic structural diagram of a computer system according to an example embodiment of the disclosure. The computer system includes a terminal 120 and a server 140.

The terminal 120 is connected to the server 140 by using a communication network 130.

In an example embodiment, the terminal 120 may include at least one of a notebook computer, a desktop computer, a smartphone, and a tablet computer.

The terminal 120 includes a first memory, a first processor, and a first communication module. The first memory stores a first program. The first program is invoked and executed by the first processor to implement the dialog generation method provided in the disclosure. The first memory may include but is not limited to the following: a random access memory (RAM), a read-only memory (ROM), a programmable read-only memory (PROM), an erasable programmable read-only memory (EPROM), and an electric erasable programmable read-only memory (EEPROM).

The first processor may include one or more integrated circuit chips. In an example embodiment, the first processor may be a general-purpose processor, for example, a central processing unit (CPU) or a network processor (NP). The first processor is configured to execute the first program stored in the first memory, to implement the dialog generation method provided in the disclosure. In an example embodiment, the first processor is configured to invoke a dialog generation model stored in the first memory to implement the above dialog generation method.

The first communication module is configured to transmit a dialog generation request to the server 140 and receive a response dialog transmitted by the server 140.

In an example embodiment, the terminal 120 includes a first display, and the first display is configured to display a response dialog generated by the terminal 120 or the server 140.

In an example embodiment, the terminal 120 includes a first speaker, and the first speaker is configured to play a response dialog generated by the terminal 120 or the server 140.

The server 140 includes a second memory, a second processor, and a second communication module. The second memory stores a second program. The second program is invoked by the second processor to process a dialog generation request transmitted by the terminal 120, to implement the dialog generation method provided in the disclosure. The second memory further stores a dialog generation model, and the dialog generation model is invoked by the second processor to implement the dialog generation method.

The second processor is configured to execute the second program stored in the second memory to implement the above dialog generation method. In an example embodiment, the second processor is configured to invoke the dialog generation model stored in the second memory to implement the dialog generation method.

In an example embodiment, the second memory may include but is not limited to the following: an RAM, an ROM, a PROM, an EPROM, and an EEPROM. In an example embodiment, the second processor may be a general-purpose processor, for example, a CPU or an NP.

The second communication module is configured to receive the dialog generation request transmitted by the terminal 120 and transmit a generated response dialog to the terminal 120.

In some embodiments, the first memory of the terminal 120 further stores a dialog generation model, and the dialog generation model is invoked by the first processor to implement the dialog generation method. Therefore, the terminal 120 may independently implement the dialog generation method provided in the disclosure.

For example, the dialog generation model provided in the disclosure may be applied to scenarios such as spoken dialog assistance, consultation services, and academic researches. This is illustrated as follows.

The dialog generation model is applied to spoken dialog assistant software. The terminal 120 collects dialog texts by using a text input control, or collects user voice by using a microphone, and converts the voice into dialog texts, invokes the dialog generation model by using the spoken dialog assistant software, to generate a response dialog corresponding to the dialog texts, and displays the response dialog by using a display, or plays voice of the response dialog by using a speaker, so that a user may perform spoken training through a dialog with a machine.

The dialog generation model is applied to consultation service software. The terminal 120 collects texts of consulted questions by using a text input control, or collects user voice by using a microphone, and converts the voice into texts of consulted questions; invokes the dialog generation model by using the consultation service software, to generate a response dialog corresponding to the consulted questions; displays the response dialog by using a display, or plays voice of the response dialog by using a speaker; and provides the user with consultation services by using a machine, thereby reducing the demand for human resources.

The dialog generation model may be applied to academia. The dialog generation model may serve as a research sample to conduct deeper technical research on a dialog system in an open domain, and even extend to the study of neural network models.

Figure 3:
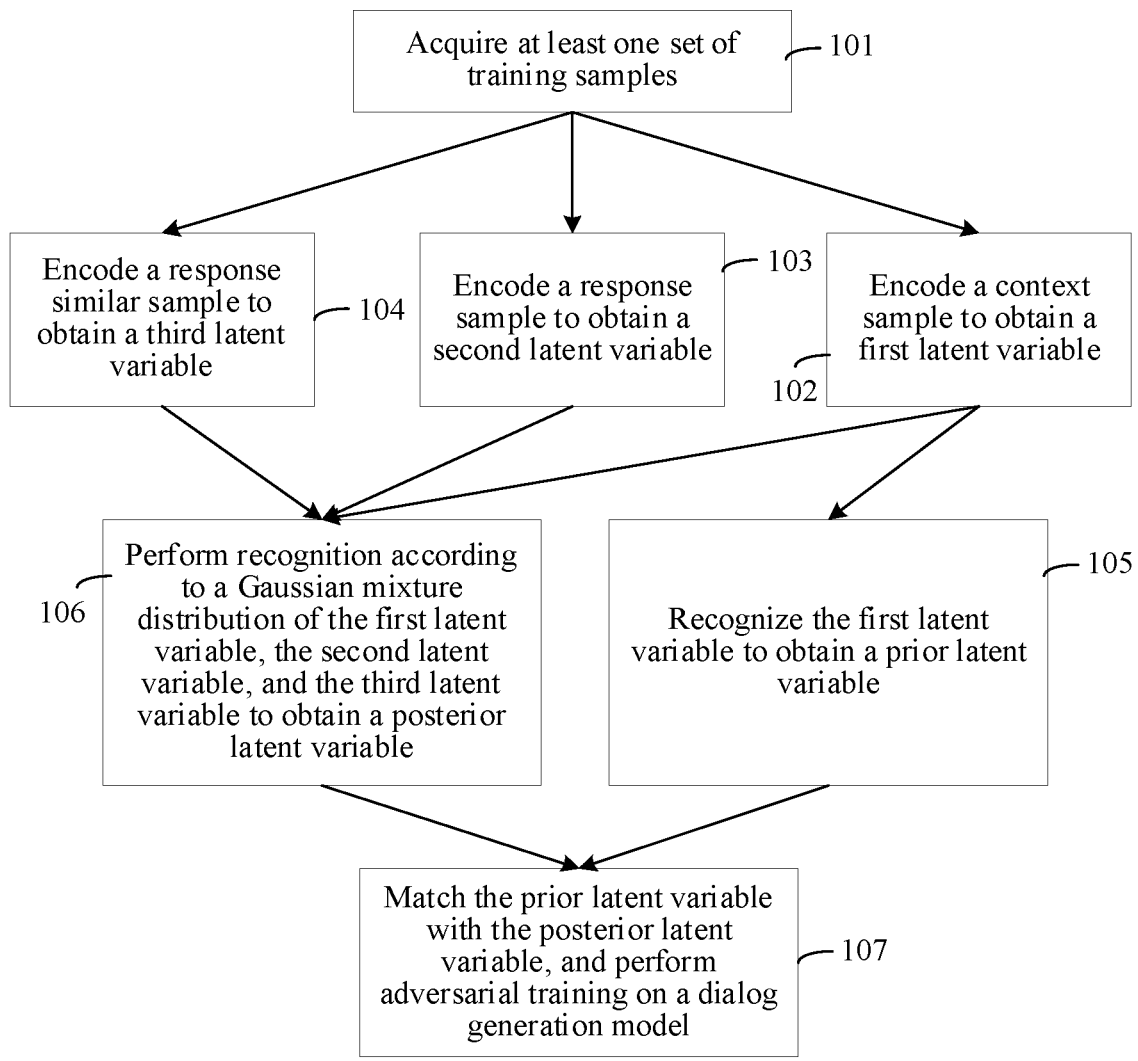
FIG. 3 is a flowchart of a method for training a dialog generation model according to an example embodiment of the disclosure.

FIG. 3 is a flowchart of a method for training a dialog generation model according to an example embodiment of the disclosure. Descriptions are made by using an example in which the method is applied to a computer device. The method includes the following operations.

Operation 101: Acquire at least one set of training samples.

Each of the sets of training samples includes a context sample, a response sample, and a response similar sample.

The response sample is a historical response collected for a topic question.

The context sample includes a collected context of the response sample. For example, the response sample is "I like tennis", and the context sample is "I like soccer", and/or "that is cool", and/or "how about you", or the like.

The response similar sample includes a similar sample of a response that is collected according to the context of the response sample. For example, the operations of collecting the response similar sample include any one of the following manners.

The first manner is: firstly, collecting the context of the response sample; secondly, collecting a similar context according to the context of the response sample; and thirdly, collecting a response corresponding to the similar context as the response similar sample.

The second manner is: firstly, collecting the context of the response sample; secondly, collecting the last sentence of a similar context according to the last sentence of the context of the response sample; thirdly, collecting the similar context and a response corresponding to the similar context according to the last sentence of the similar context; and finally using the corresponding response as the response similar sample.

The response similar sample obtained through the above collection manner is similar to the response sample. For example, the response sample is "I like fish", the response similar sample is "I like beef", "I like rice", or the like, and the topics are all favorite food.

In an example embodiment, the computer device includes any one of a terminal and a server.

Operation 102: Encode the context sample to obtain a first latent variable.

In an example embodiment, the computer device invokes the dialog generation model to encode the context sample to obtain the first latent variable.

The dialog generation model includes an utterance encoder and a context encoder. The dialog generation model encodes the context sample by using the utterance encoder and the context encoder, to obtain the first latent variable.

For example, the dialog generation model encodes at least one context in the context sample by using the utterance encoder, to obtain at least one intermediate latent variable, and inputs the at least one intermediate latent variable into the context encoder for encoding, to obtain the first latent variable.

Operation 103: Encode the response sample to obtain a second latent variable.

The computer device invokes the dialog generation model to encode the response sample to obtain the second latent variable.

In an example embodiment, the dialog generation model encodes the response sample by using the utterance encoder, to obtain the second latent variable.

Operation 104: Encode the response similar sample to obtain a third latent variable.

The computer device invokes the dialog generation model to encode the response similar sample to obtain the third latent variable.

The dialog generation model encodes the response similar sample by using the utterance encoder, to obtain the third latent variable.

In an example embodiment, the context sample includes at least one context corresponding to one first latent variable. The response sample includes a true response corresponding to one second latent variable. The response similar sample includes at least one similar response of the true response corresponding to at least one third latent variable.

Operation 105: Recognize the first latent variable to obtain a prior latent variable.

The computer device invokes the dialog generation model to recognize the first latent variable to obtain the prior latent variable.

In an example embodiment, the dialog generation model includes a prior network and a second generator. A process in which the dialog generation model recognizes the first latent variable to obtain the prior latent variable is as follows.

1) The prior network is invoked to recognize the first latent variable to obtain a third Gaussian mixture distribution and corresponding third weights.

The third Gaussian mixture distribution includes n third Gaussian distributions. Correspondingly, the dialog generation model obtains n third weights through recognition by using the prior network, where n is a positive integer greater than 2.

In an example embodiment, the prior network includes a softmax function. The operation of recognizing the third weights includes the following.

a) The softmax function is invoked to process the first latent variable to obtain the third weights. In other words, the dialog generation model inputs the first latent variable into the softmax function to calculate the third weights.

2) The prior network is invoked to respectively acquire n third Gaussian noises from n third Gaussian distributions.

3) The prior network is invoked to multiply an $i^{th}$ third Gaussian noise by a corresponding $i^{th}$ third weight to obtain an $i^{th}$ third product, and a sum of n third products is determined as a prior Gaussian noise, $0 < i \leq n$.

4) The second generator is invoked to convert the prior Gaussian noise into the prior latent variable.

Operation 106: Perform recognition according to a Gaussian mixture distribution of the first latent variable, the second latent variable, and the third latent variable to obtain a posterior latent variable.

The computer device invokes the dialog generation model to recognize the first latent variable, the second latent variable, and the third latent variable to obtain the Gaussian mixture distribution, and recognizes the posterior latent variable from the Gaussian mixture distribution.

In an example embodiment, the dialog generation model includes a recognition network and a first generator. A process in which the dialog generation model recognizes the latent variables to obtain the posterior latent variable is as follows.

1) The recognition network is invoked to recognize a sum of the second latent variable and the first latent variable to obtain a first recognition result.

The first recognition result includes a first Gaussian mixture distribution, and the first Gaussian mixture distribution includes a mean value and a variance.

In an example embodiment, the first recognition result further includes a first weight, and the first weight is used for indicating a proportion of a first Gaussian noise in a posterior Gaussian noise.

2) The recognition network is invoked to recognize a sum of the third latent variable and the first latent variable to obtain a second recognition result.

The second recognition result includes a second Gaussian mixture distribution, and the second Gaussian mixture distribution includes a mean value and a variance.

In an example embodiment, the second recognition result includes a second weight, and the second weight is used for indicating a proportion of a second Gaussian noise in the posterior Gaussian noise.

3) The recognition network is invoked to determine the posterior Gaussian noise from the first Gaussian mixture distribution and the second Gaussian mixture distribution.

In an example embodiment, a process of determining the posterior Gaussian noise is as follows.

a) The recognition network is invoked to acquire the first Gaussian noise from the first Gaussian mixture distribution, and the recognition network is invoked to acquire the second Gaussian noise from the second Gaussian mixture distribution.

In an example embodiment, the recognition network is invoked to extract the mean value and the variance of the first Gaussian mixture distribution to obtain the first Gaussian noise, and the recognition network is invoked to extract the mean value and the variance of the second Gaussian mixture distribution to obtain the second Gaussian noise.

In an example embodiment, the recognition network adopts the re-parameterization trick to extract the first Gaussian noise from the first Gaussian mixture distribution and extract the second Gaussian noise from the second Gaussian mixture distribution.

b) The recognition network is invoked to multiply the first Gaussian noise by the first weight to obtain a first product, and multiply the second Gaussian noise by the second weight to obtain a second product.

c) The recognition network is invoked to determine a sum of the first product and the second product as the posterior Gaussian noise.

4) The first generator is invoked to convert the posterior Gaussian noise into the posterior latent variable.

Operation 107: Match the prior latent variable with the posterior latent variable, and perform adversarial training on the dialog generation model.

The computer device invokes the dialog generation model to match the prior latent variable with the posterior latent variable, and performs adversarial training on the dialog generation model.

In an example embodiment, the dialog generation model minimizes a Wasserstein distance between the prior latent variable and the posterior latent variable by using a discriminator, to perform adversarial training on the dialog generation model.

Based on the above, in the method for training a dialog generation model provided in this embodiment, a similar sample in a sample set is used, and a posterior distribution of a dialog generation model is fitted by using a Gaussian mixture distribution of the similar sample, thereby achieving the purpose of fitting more complex semantics and capturing complex semantics and high variability of a dialog.

In the method, the prior network also uses the softmax function when calculating the third weights, which avoids a problem that the Gaussian mixture distribution degenerates to a simple Gaussian distribution as a result of the use of a gumbel-softmax function, so that the Gaussian distribution obtained through recognition by the prior network may be maintained as the Gaussian mixture distribution.

Operation 102 to operation 104 may be performed in parallel, and an execution order of operation 102 to operation 104 is not limited in the disclosure. Upon completion of performing of operation 102 to operation 104, operation 105 and operation 106 may be performed in parallel, and an execution order of operation 105 and operation 106 is not limited either in the disclosure.

In some embodiments, the training of the dialog generation model may be divided into three stages to implement the training of the dialog generation model from easy to difficult. The three stages are respectively as follows.

At the first stage, a response sample and a context sample are collected to train a model parameter in a posterior distribution module of the dialog generation model.

At the second stage, a response sample, a response similar sample, and a context sample are collected to train the model parameter in the posterior distribution module of the dialog generation model.

At the third stage, a response sample, a response similar sample, and a context sample are collected to perform adversarial training on a prior distribution module and the posterior distribution module of the dialog generation model.

Figure 4:
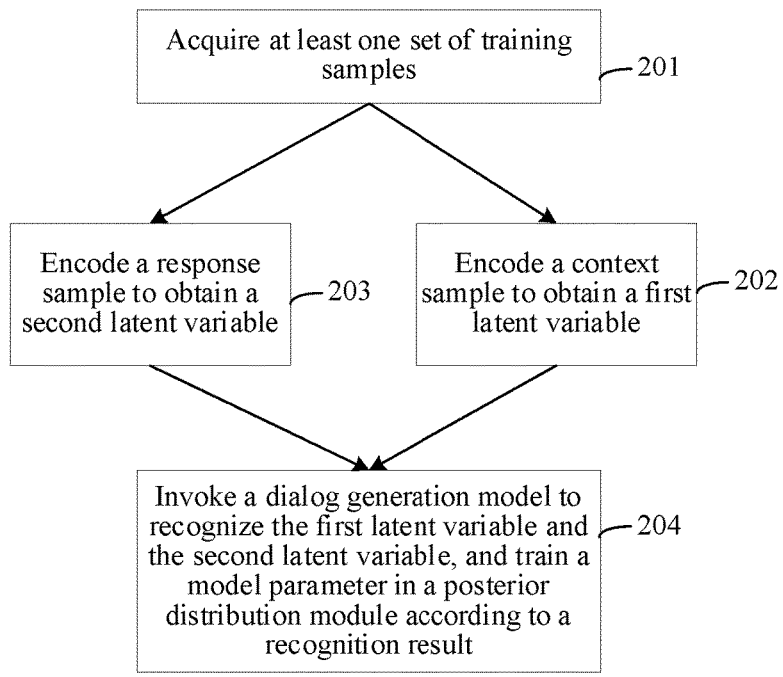
FIG. 4 is a flowchart of a method for training a dialog generation model according to another example embodiment of the disclosure.

For the first stage, as shown in FIG. 4, the dialog generation model includes a posterior distribution module, and the process of training the model parameter of the posterior distribution module includes the following operations.

Operation 201: A computer device acquires at least one set of training samples.

Each set of training samples includes a context sample and a response sample.

Operation 202: The computer device encodes the context sample to obtain a first latent variable.

For a process of encoding the context sample to obtain the first latent variable, reference is made to operation 102 shown in FIG. 3.

Operation 203: The computer device encodes the response sample to obtain a second latent variable.

For a process of encoding the response sample to obtain the second latent variable, reference is made to operation 103 shown in FIG. 3.

Operation 204: The computer device invokes the dialog generation model to recognize the first latent variable and the second latent variable, and trains the model parameter in the posterior distribution module according to a recognition result.

In an example embodiment, the computer device invokes the recognition network to recognize a sum of the first latent variable and the second latent variable, and trains the model parameter in the posterior distribution module according to a recognition result. After the sum of the first latent variable and the second latent variable is recognized, a fifth Gaussian mixture distribution is obtained, and a fifth Gaussian noise is acquired from the fifth Gaussian mixture distribution. The first generator is invoked to convert the fifth Gaussian noise into a posterior latent variable.

In an example embodiment, the dialog generation model includes a response decoder. The computer device invokes the response decoder to decode a sum of the posterior latent variable and the first latent variable to generate a response dialog.

Figure 5:
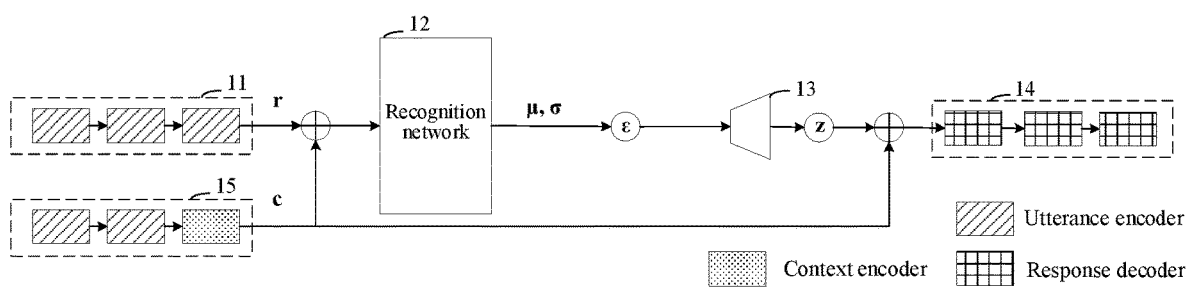
FIG. 5 is a schematic structural diagram of a dialog generation model according to another example embodiment of the disclosure.

For example, as shown in FIG. 5, the context sample is inputted into a context encoder set 15 to obtain a first latent variable c. The response sample is inputted into a group of utterance encoders 11 to obtain a second latent variable r. Latent variables such as r+c are inputted into a recognition network 12 to obtain one fifth Gaussian mixture distribution. The fifth Gaussian mixture distribution includes a mean value $\mu$ and a variance $\sigma$. A fifth Gaussian noise $\varepsilon$ is extracted from the fifth Gaussian mixture distribution, and the fifth Gaussian noise $\varepsilon$ is inputted into a first generator 13 to obtain a posterior latent variable z. A sum of z and c is inputted into a response decoder set 14 for decoding to obtain a response dialog.

Figure 6:
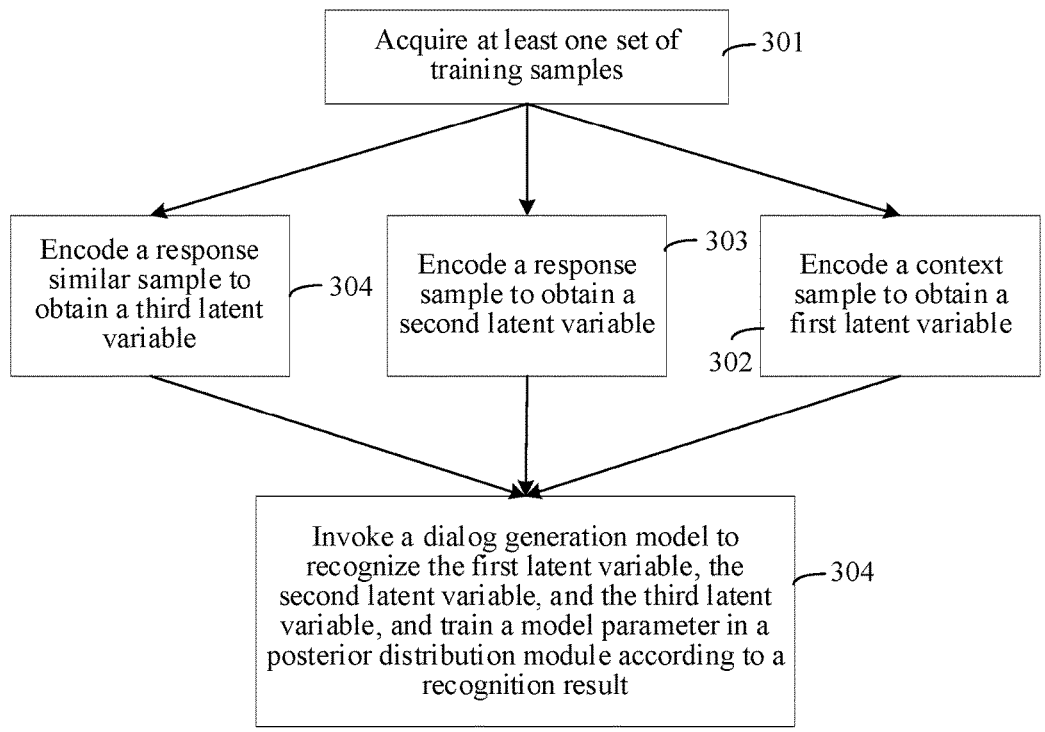
FIG. 6 is a flowchart of a method for training a dialog generation model according to another example embodiment of the disclosure.

For the second stage, as shown in FIG. 6, the dialog generation model trained at the first stage is used, and the process of training the model parameter in the posterior distribution module includes the following operations.

Operation 301: A computer device acquires at least one set of training samples.

Each of the sets of training samples includes a context sample, a response sample, and a response similar sample.

Operation 302: The computer device encodes the context sample to obtain a first latent variable.

For a process of encoding the context sample to obtain the first latent variable, reference is made to operation 102 shown in FIG. 3.

Operation 303: The computer device encodes the response sample to obtain a second latent variable.

For a process of encoding the response sample to obtain the second latent variable, reference is made to operation 103 shown in FIG. 3.

Operation 304: The computer device encodes the response similar sample to obtain a third latent variable.

For a process of encoding the response similar sample to obtain the third latent variable, reference is made to operation 104 shown in FIG. 3.

Operation 305: The computer device invokes the dialog generation model to recognize the first latent variable, the second latent variable, and the third latent variable, and trains the model parameter in the posterior distribution module according to a recognition result.

In an example embodiment, the posterior distribution module includes a recognition network, a first generator, and a response decoder. Illustrative operations of training the model parameter in the posterior distribution module are as follows.

1) The recognition network is invoked to recognize a sum of latent variables to obtain a fourth Gaussian mixture distribution.

The sum of the latent variables includes a sum of the second latent variable and the first latent variable, and a sum of the third latent variable and the first latent variable.

2) The recognition network is invoked to acquire a fourth Gaussian noise from the fourth Gaussian mixture distribution.

3) The first generator is invoked to process the fourth Gaussian noise to generate a posterior latent variable.

4) The response decoder is invoked to decode a sum of the posterior latent variable and the first latent variable to train the model parameter in the posterior distribution module.

Figure 7:
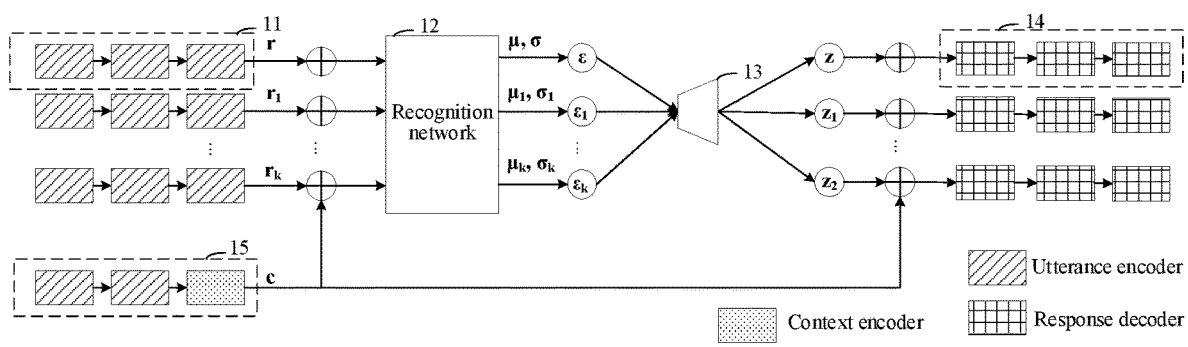
FIG. 7 is a schematic structural diagram of a dialog generation model according to another example embodiment of the disclosure.

In the process of training the model parameter in the posterior distribution module of the dialog generation model, the sum of the second latent variable and the first latent variable and the sum of the third latent variable and the first latent variable are inputted into the dialog generation model according to a chronological order to train the model parameter in the posterior distribution module. For example, as shown in FIG. 7, the context sample is inputted into a context encoder set 15 to obtain a first latent variable c. The response sample is inputted into a first group of utterance encoders to obtain a second latent variable r. The response similar sample is inputted into a second group of utterance encoders to obtain third latent variables $r_1, \ldots,$ and $r_k$. Latent variables such as r+c, $r_1$+c, . . . , and $r_k$+c are successively inputted into a recognition network 12 to obtain k+1 four Gaussian mixture distributions. The fourth Gaussian mixture distribution includes mean values $\mu, \mu_1, \ldots,$ and $\mu_k$ and variances $\sigma, \sigma_1, \ldots,$ and $\sigma_k$. Fifth Gaussian noises $\varepsilon, \varepsilon_1, \ldots,$ and $\varepsilon_k$ are extracted from the fourth Gaussian mixture distribution. The fifth Gaussian noises $\varepsilon, \varepsilon_1, \ldots,$ and $\varepsilon_k$ are converted into posterior latent variables $z, z_1, \ldots,$ and $z_k$ by using the first generator 13. The posterior latent variables $z, z_1, \ldots,$ and $z_k$ are respectively decoded to generate response dialogs.

For the third stage, the dialog generation model trained at the second stage is used. For a process of training the dialog generation model at the third stage, reference is made to operation 101 to operation 107, and details are not described herein again. At the third stage, the dialog generation model trained at the first stage may also be used. Alternatively, the dialog generation model used in the second stage is not the dialog generation model trained at the first stage.

Based on the above, according to the method for training a dialog generation model provided in this embodiment, the training process of the dialog generation model from easy to difficult is implemented through the training of the three stages, to generate more diverse dialogs.

Figure 8:
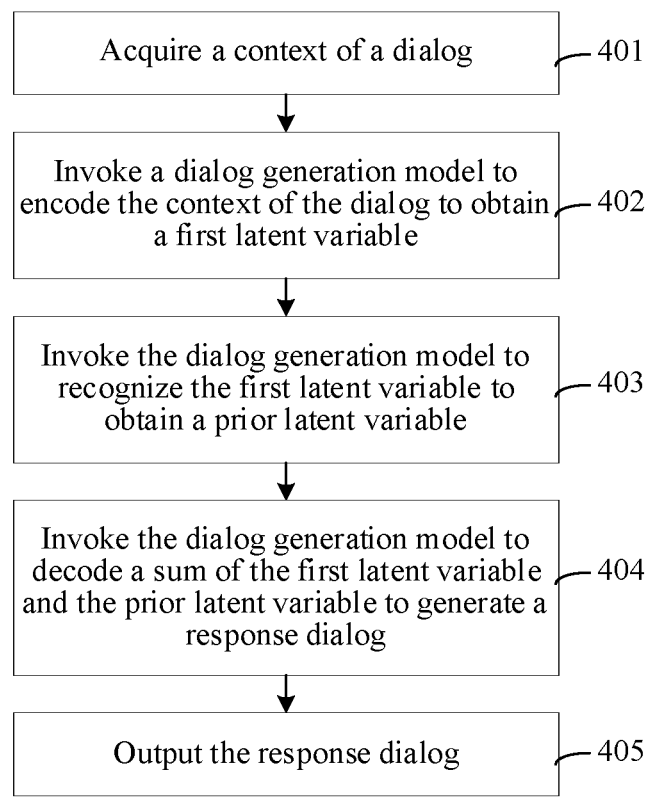
FIG. 8 is a flowchart of a dialog generation method according to an example embodiment of the disclosure.

The dialog generation model includes a response decoder. The dialog generation model decodes the sum of the posterior latent variable and the first latent variable by using the response decoder, to generate a response dialog. For example, the above describes the processes of the training stages of the dialog generation model. However, at a generation stage, the dialog generation model decodes a sum of the first latent variable and the prior latent variable, to generate a dialog. FIG. 8 is a flowchart of a dialog generation method according to an example embodiment, to describe the generation stage. Descriptions are made by using an example in which the method is applied to a server running a dialog generation model. The method includes the following operations.

Operation 401: Acquire a context of a dialog.

Operation 402: Invoke the dialog generation model to encode the context of the dialog to obtain a first latent variable.

The dialog generation model refers to a dialog generation model that has been trained by using the method for training a dialog generation model provided in the disclosure.

In an example embodiment, the dialog generation model includes an utterance encoder and a context encoder. The dialog generation model encodes the context of the dialog by using the utterance encoder and the context encoder, to obtain the first latent variable.

Operation 403: Invoke the dialog generation model to recognize the first latent variable to obtain a prior latent variable.

In an example embodiment, the dialog generation model includes a prior network and a generator. Illustrative operations of generating the prior latent variable are as follows.

1) Invoke the prior network to recognize the first latent variable to obtain a prior Gaussian noise.

In an example embodiment, the prior network includes a softmax function. Illustrative operations of recognizing the prior Gaussian noise are as follows.

a) Recognize the first latent variable to obtain a third Gaussian mixture distribution, and invoke the softmax function to determine corresponding third weights, the third Gaussian mixture distribution including n third Gaussian distributions.

b) Respectively acquire n third Gaussian noises from the n third Gaussian distributions.

c) Multiply an $i^{th}$ third Gaussian noise by a corresponding $i^{th}$ third weight to obtain an $i^{th}$ third product, and determine a sum of n third products as a prior Gaussian noise, $0<i\le n$.

2) Invoke the generator to process the prior Gaussian noise to obtain the prior latent variable.

Operation 404: A computer device invokes the dialog generation model to decode a sum of the first latent variable and the prior latent variable, to generate a response dialog.

In an example embodiment, the dialog generation model includes a response decoder. The computer device invokes the response decoder to decode the sum of the first latent variable and the prior latent variable, to generate the response dialog.

Operation 405: The computer device outputs the response dialog.

In an example embodiment, the computer device outputs the response dialog by using a display, or plays the response dialog by using a speaker.

Based on the above, according to the dialog generation method provided in this embodiment, the dialog generation model is invoked, and the dialog generation model is a dialog generation model that has been trained by using the method for training a dialog generation model provided in the disclosure, thereby capturing complex semantics and high variability of a dialog, and generating diverse response dialogs.

In the method, the prior network also uses the softmax function when calculating the third weights, which avoids a problem that the Gaussian mixture distribution degenerates to a simple Gaussian distribution as a result of the use of a gumbel-softmax function, so that the Gaussian distribution obtained through recognition by the prior network may be maintained as the Gaussian mixture distribution.

In order to test the effectiveness of the dialog generation model provided in the disclosure, the dialog generation model provided in the disclosure may be evaluated through automatic evaluation and manual evaluation. When the dialog generation model provided in the disclosure is automatically evaluated, 8 existing dialog generation models are used as reference models to make a comparison with the performance of the dialog generation model provided in the disclosure. The 8 existing dialog generation models include: a hierarchical recurrent encoder-decoder (HRED) model, a sequence generative adversarial network (SeqGAN) model, a conditional variational auto-encoder (CVAE) model, a CVAE-bag-of-words (CVAE-BOW) model, a CVAE-collaborative (CVAE-CO) model, a latent variable hierarchical recurrent encoder-decoder (VHRED) model, a VHCR model, and a DialogWAE-GMP model.

The automatic evaluation uses indicators that may reflect correlation and diversity: word embeddings and distances. The word embedding represents a cosine similarity between a prediction and a response, and the cosine similarity may be used for evaluating the correlation of generated responses. The word embedding in the disclosure includes a mean value, an extreme value, and a greedy value. At a test stage, 10 predicted responses in each test environment are sampled, and the largest word embedding score among the 10 sampled responses is calculated as a final report result. The distance is used for measuring the diversity of the generated responses. In the disclosure, a mean value of the corresponding distances when a value of n in an N-gram model is 1 (corresponding to the distance 1 in the table) and 2 (corresponding to the distance 2 in the table) is calculated in the disclosure. For example, Table 1 shows performance comparison data of a switch dataset, and Table 2 shows performance comparison of a dataset of daily dialogs.

TABLE 1

| | Model | | | | | | |
|---|---|---|---|---|---|---|---|
| | Word embedding | | | Inter-class distance | | Middle distance | |
| | Mean value | Extreme value | Greedy value | Distance 1 | Distance 2 | Distance 1 | Distance 2 |
| HRED | 0.820 | 0.537 | 0.832 | 0.813 | 0.452 | 0.081 | 0.045 |
| SeqGAN | 0.817 | 0.515 | 0.748 | 0.705 | 0.521 | 0.070 | 0.052 |
| CVAE | 0.836 | 0.572 | 0.846 | 0.803 | 0.415 | 0.112 | 0.102 |
| CVAE-BOW | 0.828 | 0.555 | 0.840 | 0.819 | 0.493 | 0.107 | 0.099 |
| CVAE-CO | 0.839 | 0.557 | 0.855 | 0.863 | 0.581 | 0.111 | 0.110 |
| VHRED | 0.810 | 0.531 | 0.844 | 0.881 | 0.522 | 0.110 | 0.092 |
| VHCR | 0.826 | 0.546 | 0.851 | 0.877 | 0.536 | 0.130 | 0.131 |
| DialogWAE-GMP | 0.925 | 0.661 | 0.894 | 0.713 | 0.671 | 0.333 | 0.555 |
| Dialog generation model provided in the disclosure | 0.921 | 0.670 | 0.901 | 0.952 | 0.601 | 0.594 | 0.825 |

TABLE 2

| | Model | | | | | | |
|---|---|---|---|---|---|---|---|
| | Word embedding | | | Inter-class distance | | Middle distance | |
| | Mean value | Extreme value | Greedy value | Distance 1 | Distance 2 | Distance 1 | Distance 2 |
| HRED | 0.915 | 0.511 | 0.798 | 0.935 | 0.969 | 0.093 | 0.097 |
| SeqGAN | 0.907 | 0.495 | 0.774 | 0.747 | 0.806 | 0.075 | 0.081 |
| CVAE | 0.923 | 0.543 | 0.811 | 0.938 | 0.973 | 0.177 | 0.222 |
| CVAE-BOW | 0.923 | 0.540 | 0.812 | 0.947 | 0.976 | 0.165 | 0.206 |
| CVAE-CO | 0.914 | 0.530 | 0.818 | 0.821 | 0.911 | 0.106 | 0.126 |
| VHRED | 0.892 | 0.507 | 0.786 | 0.633 | 0.771 | 0.071 | 0.089 |
| VHCR | 0.925 | 0.525 | 0.798 | 0.768 | 0.814 | 0.105 | 0.129 |
| DialogWAE-GMP | 0.952 | 0.591 | 0.853 | 0.754 | 0.892 | 0.313 | 0.597 |
| Dialog generation model provided in the disclosure | 0.947 | 0.610 | 0.867 | 0.912 | 0.976 | 0.462 | 0.794 |

In the manual evaluation, 150 dialogs are randomly extracted from a test set of daily dialogs for evaluation. For each context in the test, 10 responses are generated from the evaluated models, and the responses are also generated response dialogs. Three commentators check the response dialogs of each context, select a model that performs best in terms of fluency, consistency, and diversity, and calculate a manual evaluation score of the responses for each model at a ratio under each metric.

The test results are quantitatively analyzed. It can be known from Table 1 and Table 2 that the dialog generation model provided in the disclosure is superior to all reference models in all metrics in the two datasets. In other words, the dialog generation model provided in the disclosure may generate more coherent response dialogs, which enhances the diversity of dialogs.

Figure 9:
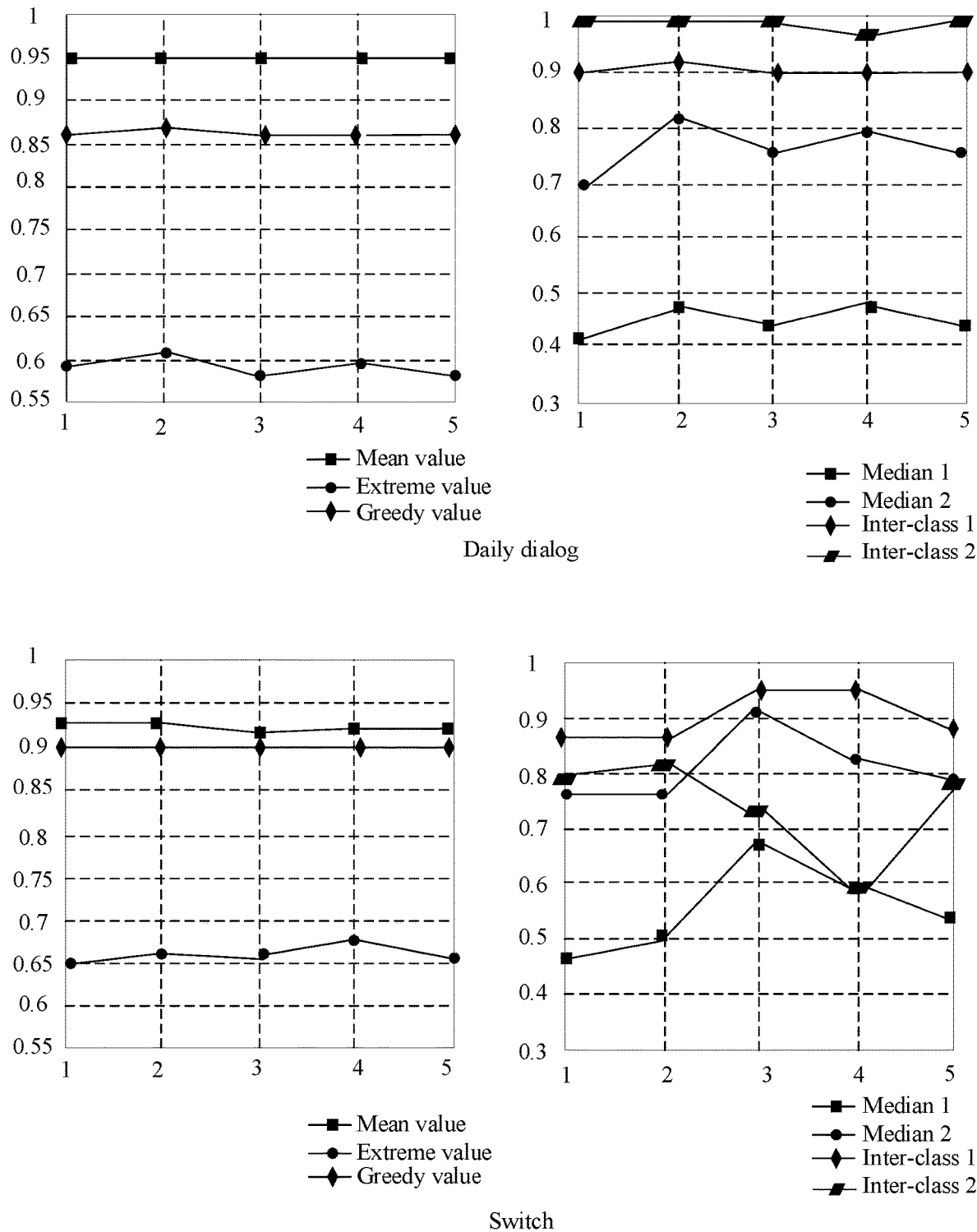
FIG. 9 is a performance change curve of the dialog generation model according to an example embodiment of the disclosure.

A quantity k of posterior latent variables has an impact on performance. It can be seen from FIG. 9 that in most cases, the performance is improved as k increases. When k exceeds a specific threshold, the performance is degraded as k increases. For example, a threshold is 4, and with the change of k, the fluctuation of a word embedding score is relatively small, which indicates that the correlation is basically stable with the increase of k. Based on the principle of not losing the correlation, the diversity may be improved by setting the value of k. Through comprehensive consideration, in the test experiment, k is set to 4.

The test results are qualitatively analyzed. Table 3 shows examples of the response dialogs generated by the DialogWAE-GMP model and the dialog generation model provided in the disclosure. It can be seen that the response dialogs generated by the dialog generation model provided in the disclosure are more fluent, more correlated and diverse than the response dialogs generated by the DialogWAE-GMP model.

TABLE 3

| Context | DialogWAE-GMP | Dialog generation model provided in the disclosure |
|---|---|---|
| How much is the rent? -> The rent is $1500 per month. | E.g. 1: No problem. I'll take it. E.g. 2: This one is $1505 per month. E.g. 3: That sounds like a good idea. | E.g. 1: Oh, that's too expensive. E.g. 2: Will it be cash dollars? E.g. 3: I have to pay for it. |
| Guess who I saw just now? -> Who? -> John Smith. -> That bad egg who took the low road since he was a boy. | E.g. 1: It is my favorite. E.g. 2: No, but I didn't think he was able to get married. I had no idea to get her. E.g. 3: This is not, but it's not that bad. It's just a little bit, but it's not too bad. | E.g. 1: His face is lost. E.g. 2: Oh, he's really very serious. He doesn't look like the one. E.g. 3: It must be right around the moment. |
| Thank you for calling world airline. What can I do for you? | E.g. 1: I'd like to make a reservation for you. E.g. 2: Do you know where I can get to? E.g. 3: Can you tell me the way to the station? | E.g. 1: Oh yes, there's a problem with my account, please. E.g. 2: Well, there would be some great problems for you. E.g. 3: Sorry, sir. Here is your bill. Please check in. |

Table 4 shows manual evaluation of the models using the DailyDialog dataset. It may be seen that the dialog generation model provided in the disclosure is significantly better than the DialogWAE-GMP model in terms of fluency, correlation, and diversity. However, in the disclosure, the dialog generation model trained by using a course optimization strategy is significantly better than the dialog generation model trained without using the course optimization strategy in terms of fluency, correlation, and diversity.

TABLE 4

| Model | Fluency | Correlation | Diversity |
|---|---|---|---|
| DialogWAE-GMP | 24.1% | 27.3% | 22.5% |
| Dialog generation model trained by using course optimization strategy in the disclosure | 44.0% | 38.2% | 46.3% |
| Dialog generation model trained without using course optimization strategy in the disclosure | 31.9% | 34.5% | 31.2% |

For example, it can be seen from Table 5 that each stage of the course optimization strategy facilitates enhancement of the correlation and diversity of the response dialog generated by the dialog generation model provided in the disclosure.

TABLE 5

| Model | Fluency | Correlation | Diversity |
|---|---|---|---|
| Dialog generation model provided in the disclosure | 50.6% | 48.7% | 48.7% |
| Model trained by using course optimization strategy at stage I | 20.7% | 7.3% | 22.0% |
| Model trained by using course optimization strategy at stage II | 18.0% | 21.3% | 18.0% |

TABLE 5-continued

| Model | Fluency | Correlation | Diversity |
|---|---|---|---|
| Model trained by using course optimization strategy at stage III | 10.7% | 22.7% | 11.3% |

Based on the above, the disclosure provides a new dialog generation system architecture, which adopts the method of example enhancement and course optimization to enhance the diversity and correlation of the generated response dialog. In other words, firstly, examples are fully utilized to approximate a more complex Gaussian mixture distribution, which facilitates simulation of high variability of generated responses (generated response dialogs). In addition, through the three stages from easy to difficult, the training in a course optimization mode is gradually performed, which further improves the diversity and correlation of the response dialogs. The experimental results of the above two datasets show that, compared with the above reference models, the dialog generation model provided in the disclosure may generate more diverse and correlated responses.

Figure 10:
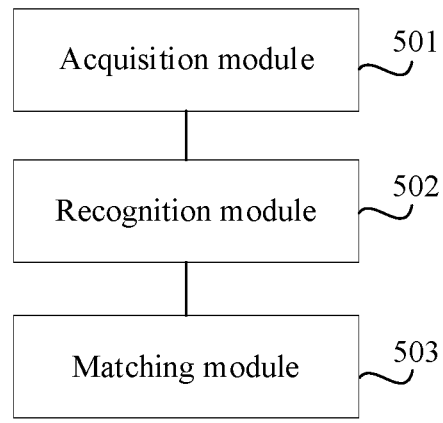
FIG. 10 is a block diagram of an apparatus for training a dialog generation model according to an example embodiment of the disclosure.

FIG. 10 is a block diagram of an apparatus for training a dialog generation model according to an example embodiment of the disclosure. The apparatus is implemented as part or all of a terminal or a server through software, hardware, or a combination of the two, and the apparatus includes:

an acquisition module 501, configured to acquire at least one set of training samples, the training samples including a context sample, a response sample, and a response similar sample;

a recognition module 502, configured to encode the context sample to obtain a first latent variable, and recognize the first latent variable to obtain a prior latent variable, the recognition module 502 being configured to encode the response sample to obtain a second latent variable, encode the response similar sample to obtain a third latent variable, and perform recognition according to a Gaussian mixture distribution of the first latent variable, the second latent variable, and the third latent variable to obtain a posterior latent variable; and a matching module 503, configured to match the prior latent variable with the posterior latent variable, and perform adversarial training on a dialog generation model, the response similar sample including a similar sample of a response that is collected according to a context of the response sample, and the context sample including a collected context of the response sample.

In some embodiments, the dialog generation model includes a recognition network and a first generator.

The recognition module 502 is configured to invoke the recognition network to recognize a sum of the second latent variable and the first latent variable to obtain a first recognition result, and invoke the recognition network to recognize a sum of the third latent variable and the first latent variable to obtain a second recognition result, the first recognition result including a first Gaussian mixture distribution, and the second recognition result including a second Gaussian mixture distribution.

The recognition module 502 is configured to invoke the recognition network to determine a posterior Gaussian noise from the first Gaussian mixture distribution and the second Gaussian mixture distribution.

The recognition module 502 is configured to invoke the first generator to convert the posterior Gaussian noise into the posterior latent variable.

In some embodiments, the first recognition result further includes a first weight, and the second recognition result further includes a second weight.

The recognition module 502 is configured to invoke the recognition network to acquire a first Gaussian noise from the first Gaussian mixture distribution, invoke the recognition network to acquire a second Gaussian noise from the second Gaussian mixture distribution, invoke the recognition network to multiply the first Gaussian noise by the first weight to obtain a first product and multiply the second Gaussian noise by the second weight to obtain a second product, and invoke the recognition network to determine a sum of the first product and the second product as the posterior Gaussian noise.

In some embodiments, the dialog generation model includes a prior network and a second generator.

The recognition module 502 is configured to invoke the prior network to recognize the first latent variable to obtain a third Gaussian mixture distribution and corresponding third weights, the third Gaussian mixture distribution including n third Gaussian noises, multiply an $i^{th}$ third Gaussian noise by a corresponding $i^{th}$ third weight to obtain an $i^{th}$ third product, $0<i\le n$; and determine a sum of n third products as a prior Gaussian noise.

The recognition module 502 is configured to invoke the second generator to convert the prior Gaussian noise into the prior latent variable, n being a positive integer greater than 2.

In some embodiments, the prior network includes a normalized exponential function.

The recognition module 502 is configured to invoke the normalized exponential function to process the first latent variable to obtain the third weights.

In some embodiments, the dialog generation model includes a posterior distribution module.

The recognition module 502 is further configured to invoke the dialog generation model to recognize the first latent variable, the second latent variable, and the third latent variable, and train a model parameter in the posterior distribution module according to a recognition result.

In some embodiments, the posterior distribution module includes a recognition network, a first generator, and a response decoder.

The recognition module 502 is configured to invoke the recognition network to recognize a sum of latent variables to obtain a fourth Gaussian mixture distribution, invoke the recognition network to acquire a fourth Gaussian noise from the fourth Gaussian mixture distribution, invoke the first generator to process the fourth Gaussian noise to generate the posterior latent variable, and invoke the response decoder to decode a sum of the posterior latent variable and the first latent variable to train the model parameter in the posterior distribution module.

The sum of the latent variables includes a sum of the second latent variable and the first latent variable, and a sum of the third latent variable and the first latent variable.

In some embodiments, the dialog generation model includes a posterior distribution module.

The recognition module 502 is configured to invoke the dialog generation model to recognize the first latent variable and the second latent variable, and train the model parameter in the posterior distribution module according to the recognition result.

Based on the above, the apparatus for training a dialog generation model provided in this embodiment uses a similar sample in a sample set, and fits a posterior distribution of a dialog generation model by using a Gaussian mixture distribution of the similar sample, thereby achieving the purpose of fitting more complex semantics and capturing complex semantics and high variability of a dialog.

In the apparatus, the prior network also uses a softmax function when calculating the third weight, which avoids a problem that the Gaussian mixture distribution degenerates to a simple Gaussian distribution as a result of the use of a gumbel-softmax function, so that the Gaussian distribution obtained through recognition by the prior network may be maintained as the Gaussian mixture distribution.

Figure 11:
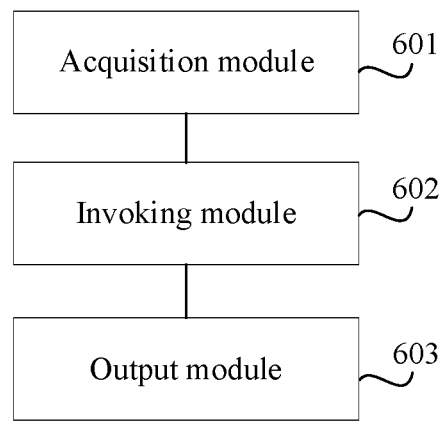
FIG. 11 is a block diagram of a dialog generation apparatus according to an example embodiment of the disclosure.

FIG. 11 is a block diagram of a dialog generation model according to another example embodiment of the disclosure. A dialog generation model is run in the apparatus, and the dialog generation model is a dialog generation model that has been trained by using the method for training a dialog generation model provided in the disclosure. The apparatus is implemented as part or all of a terminal or a server through software, hardware, or a combination of the two, and the apparatus includes:

an acquisition module 601, configured to acquire a context of a dialog;

an invoking module 602, configured to invoke the dialog generation model to encode the context of the dialog to obtain a first latent variable, the invoking module 602 being configured to invoke the dialog generation model to recognize the first latent variable to obtain a prior latent variable, and the invoking module 602 being configured to invoke the dialog generation model to decode a sum of the first latent variable and the prior latent variable to generate a response dialog; and an output module 603, configured to output the response dialog.

In some embodiments, the dialog generation model includes a prior network and a generator.

The invoking module 602 is configured to invoke the prior network to recognize the first latent variable to obtain a prior Gaussian noise, and invoke the generator to process the prior Gaussian noise to obtain the prior latent variable.

In some embodiments, the prior network includes a normalized exponential function.

The invoking module 602 is configured to recognize the first latent variable to obtain a third Gaussian mixture distribution, invoke the normalized exponential function to determine third weights corresponding to the third Gaussian mixture distribution, the third Gaussian mixture distribution including n third Gaussian noises, multiply an $i^{th}$ third Gaussian noise by a corresponding $i^{th}$ third weight to obtain an $i^{th}$ third product, and determine a sum of n third products as the prior Gaussian noise, $0<i\leq n$, and n being a positive integer greater than 2.

Based on the above, the dialog generation apparatus provided in this embodiment invokes the dialog generation model, and the dialog generation model is a dialog generation model that has been trained by using the method for training a dialog generation model provided in the disclosure, thereby capturing the complex semantics and high variability of a dialog, and generating diverse response dialogs.

In the apparatus, the prior network also uses a softmax function when calculating the third weight, which avoids a problem that the Gaussian mixture distribution degenerates to a simple Gaussian distribution as a result of the use of a gumbel-softmax function, so that the Gaussian distribution obtained through recognition by the prior network may be maintained as the Gaussian mixture distribution.

Figure 12:
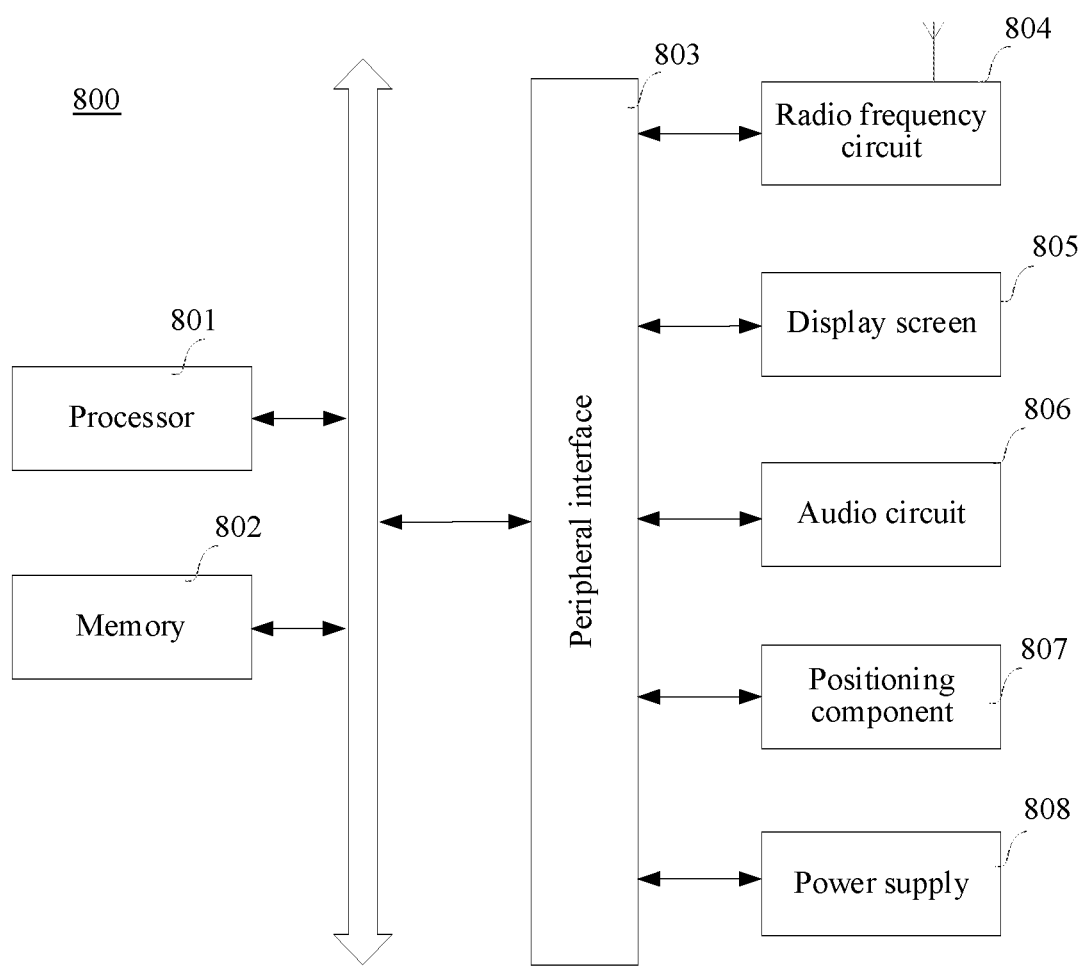
FIG. 12 is a schematic structural diagram of a computer device according to an example embodiment of the disclosure.

FIG. 12 shows a structural block diagram of a terminal 800 according to an example embodiment of the disclosure. The terminal 800 may be a smartphone, a tablet computer, a Moving Picture Experts Group Audio Layer III (MP3) player, a Moving Picture Experts Group Audio Layer IV (MP4) player, a notebook computer, or a desktop computer. The terminal 800 may also be referred to as user equipment, a portable terminal, a laptop terminal, a desktop terminal, or the like.

Generally, the terminal 800 includes a processor 801 and a memory 802.

The processor 801 may include one or more processing cores. For example, the processor 801 may be a 4-core processor or an 8-core processor. The processor 801 may be implemented in at least one hardware form of a digital signal processor (DSP), a field-programmable gate array (FPGA), and a programmable logic array (PLA). The processor 801 may also include a main processor and a coprocessor. The main processor is a processor configured to process data in an awake state, and is also referred to as a central processing unit (CPU). The coprocessor is a low-power processor configured to process data in a standby state. In some embodiments, a graphics processing unit (GPU) may be integrated with the processor 801. The GPU is configured to render and draw content to be displayed on a display screen. In some embodiments, the processor 801 may further include an AI processor. The AI processor is configured to process a computing operation related to machine learning.

The memory 802 may include one or more computer-readable storage media. The computer-readable storage medium may be non-transient. The memory 802 may further include a high-speed random access memory, and a non-volatile memory such as one or more magnetic disk storage devices or flash storage devices. In some embodiments, the non-transitory computer-readable storage medium in the memory 802 is configured to store at least one instruction, and the at least one instruction being configured to be executed by the processor 801 to implement the method for training a dialog generation model and the dialog generation method provided in the method embodiments of the disclosure.

In some embodiments, the terminal 800 may include a peripheral interface 803 and at least one peripheral. The processor 801, the memory 802, and the peripheral interface 803 may be connected by a bus or a signal cable. Each peripheral may be connected to the peripheral interface 803 by using a bus, a signal cable, or a circuit board. Specifically, the peripheral includes: at least one of a radio frequency (RF) circuit 804, a display screen 805, an audio circuit 806, a positioning component 807, and a power supply 808.

The peripheral interface 803 may be configured to connect at least one peripheral related to I/O to the processor 801 and the memory 802. In some embodiments, the processor 801, the memory 802, and the peripheral interface 803 are integrated on the same chip or circuit board. In some other embodiments, any one or two of the processor 801, the memory 802, and the peripheral interface 803 may be implemented on a single chip or circuit board. This is not limited in this embodiment.

The RF circuit 804 is configured to receive and transmit an RF signal, which is also referred to as an electromagnetic signal. The RF circuit 804 communicates with a communication network and other communication devices through the electromagnetic signal. The RF circuit 804 converts an electrical signal into an electromagnetic signal for transmission, or converts a received electromagnetic signal into an electrical signal. In an example embodiment, the RF circuit 804 includes: an antenna system, an RF transceiver, one or more amplifiers, a tuner, an oscillator, a digital signal processor, a codec chip set, a subscriber identity module card, and the like. The RF circuit 804 may communicate with another terminal by using at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the RF circuit 804 may also include a circuit related to near-field communication (NFC). This is not limited in the disclosure.

The display screen 805 is configured to display a user interface (UI). The UI may include a graph, a text, an icon, a video, and any combination thereof. When the display screen 805 is a touch display screen, the display screen 805 is further capable of acquiring touch signals on or above a surface of the display screen 805. The touch signal may be inputted, as a control signal, to the processor 801 for processing. In this case, the display screen 805 may be further configured to provide a virtual button and/or a virtual keyboard, which is also referred to as a soft button and/or a soft keyboard. In some embodiments, there may be one display screen 805 disposed on a front panel of the terminal 800. In some other embodiments, there may be at least two display screens 805 disposed on different surfaces of the terminal 800 or designed in a foldable shape. In still some other embodiments, the display screen 805 may be a flexible display screen disposed on a curved surface or a folded surface of the terminal 800. Even, the display screen 805 may be further set to have a non-rectangular irregular shape, that is, a special-shaped screen. The display screen 805 may be made of materials such as a liquid crystal display (LCD), an organic light-emitting diode (OLED), or the like.

The audio circuit 806 may include a microphone and a loudspeaker. The microphone is configured to acquire sound waves of a user and an environment, and convert the sound waves into electrical signals and input the electrical signals into the processor 801 for processing, or input the electrical signals into the RF circuit 804 to implement voice communication. For a purpose of stereo acquisition or noise reduction, there may be a plurality of microphones disposed at different portions of the terminal 800. The microphone may be further an array microphone or an omnidirectional microphone. The speaker is configured to convert electric signals from the processor 801 or the RF circuit 804 into sound waves. The loudspeaker may be a conventional thin-film loudspeaker or a piezoelectric ceramic loudspeaker. When the loudspeaker is the piezoelectric ceramic loudspeaker, the speaker may not only convert an electrical signal into sound waves audible to a human being, but also convert an electrical signal into sound waves inaudible to the human being for ranging and other purposes. In some embodiments, the audio circuit 806 may also include an earphone jack.

The positioning component 807 is configured to determine a current geographical position of the terminal 800, to implement navigation or a location based service (LBS). The positioning component 807 may be a positioning component based on the Global Positioning System (GPS) of the United States, the BeiDou System of China, the GLONASS System of Russia, or the GALILEO System of the European Union.

The power supply 808 is configured to supply power to components in the terminal 800. The power supply 808 may be an alternating-current power supply, a direct-current power supply, a disposable battery, or a rechargeable battery. In a case that the power supply 808 includes the rechargeable battery, the rechargeable battery may support wired charging or wireless charging. The rechargeable battery may be further configured to support a fast charge technology.

A person skilled in the art would understand that the structure shown in FIG. 12 does not constitute a limitation on the terminal 800 and that the terminal may include more or fewer assemblies than those shown in the figure, a combination of some assemblies, or different assembly arrangements.

Figure 13:
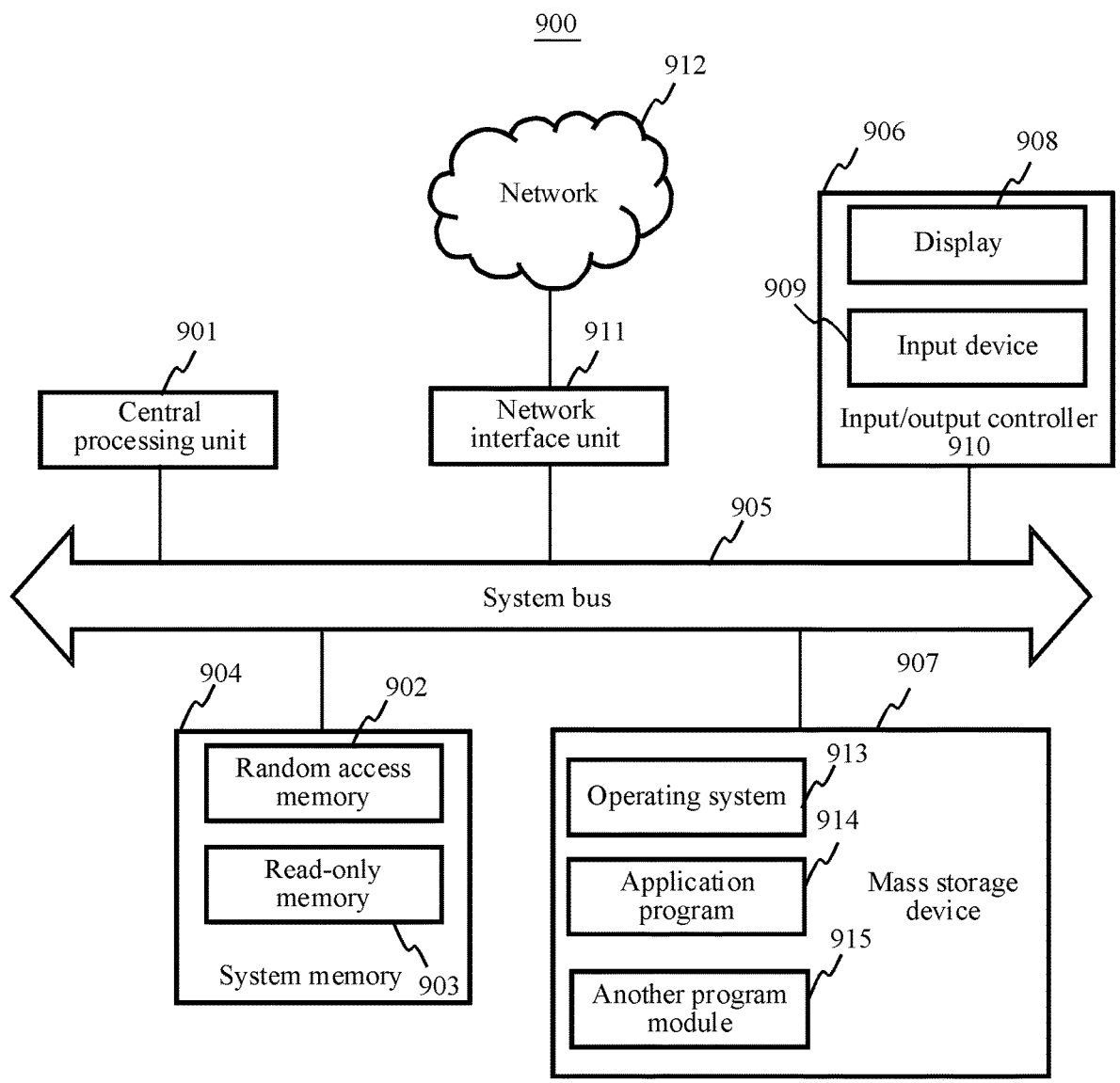
FIG. 13 is a schematic structural diagram of a server according to an example embodiment of the disclosure.

FIG. 13 is a schematic structural diagram of a server according to an embodiment of the disclosure. The server is configured to implement the method for training a dialog generation model and the dialog generation method provided in the above embodiments. Specifically, the server 900 includes a CPU 901, a system memory 904 including a random access memory (RAM) 902 and a read-only memory (ROM) 903, and a system bus 905 connecting the system memory 904 and the CPU 901. The server 900 further includes a basic I/O system 906 for facilitating information transmission between various devices in a computer and a mass storage device 907 configured to store an operating system 913, an application program 914, and other program modules 915.

The basic I/O system 906 includes a display 908 configured to display information and an input device 909 such as a mouse and a keyboard for a user to input information. The display 908 and the input device 909 are both connected to the CPU 901 through an I/O controller 910 connected to the system bus 905. The basic I/O system 906 may further include the I/O controller 910 for receiving and processing input from a plurality of other devices such as a keyboard, a mouse, an electronic stylus, or the like. Similarly, the I/O controller 910 further provides output to a display screen, a printer, or other types of output devices.

The mass storage device 907 is connected to the central processing unit 901 through a mass storage controller (not shown) connected to the system bus 905. The mass storage device 907 and an associated computer readable medium thereof provide non-volatile storage for the server 900. In other words, the mass storage device 907 may include a computer-readable medium (not shown) such as a hard disk or a CD-ROM drive.

According to various embodiments of the disclosure, the server 900 may be further connected to a remote computer on a network to run through a network such as the Internet. In other words, the server 900 may be connected to a network 912 through a network interface unit 911 connected to the system bus 905, or may be connected to other types of networks or remote computer systems (not shown) through the network interface unit 911.

An embodiment of the disclosure further provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the method for training a dialog generation model according to any one of the foregoing embodiments, or the dialog generation method.

Beneficial effects brought by the technical solutions provided in the embodiments of the disclosure include at least the following.

A similar sample in a sample set is used, and a posterior distribution of a dialog generation model is fitted by using a Gaussian mixture distribution of the similar sample, thereby achieving the purpose of fitting more complex semantics and capturing complex semantics and high variability of a dialog.

In the method, the prior network also uses the normalized exponential function (that is, a softmax function) when calculating the third weight, which avoids a problem that the Gaussian mixture distribution degenerates to a simple Gaussian distribution as a result of the use of an extreme normalization function (that is, a gumbel-softmax function), so that the Gaussian distribution obtained through recognition by the prior network may be maintained as the Gaussian mixture distribution.

The sequence numbers of the foregoing embodiments of the disclosure are merely for description purposes, and are not intended to indicate the preference among the embodiments.

A person of ordinary skill in the art would understand that all or some of the operations of the foregoing embodiments may be implemented by hardware, or may be implemented a program instructing related hardware. The program may be stored in a computer-readable storage medium. The storage medium may include a ROM, a magnetic disk, or an optical disc. For example, the storage medium may include a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure, and are not intended to limit the disclosure. Any modification, equivalent replacement, improvement, and the like made within the spirit and principle of the disclosure shall fall within the protection scope of the disclosure.

What is claimed is:

1. A method for training a dialog generation model, performed by a computer device, the method comprising:
    acquiring at least one set of training samples, the training samples comprising a context sample, a response sample, and a response similar sample;
    encoding the context sample to obtain a first latent variable, and recognizing the first latent variable to obtain a prior latent variable;
    encoding the response sample to obtain a second latent variable, encoding the response similar sample to obtain a third latent variable, and performing recognition according to a Gaussian mixture distribution of the first latent variable, the second latent variable, and the third latent variable to obtain a posterior latent variable; and
    matching the prior latent variable with the posterior latent variable, and performing adversarial training on a dialog generation model,
    the response similar sample comprising a similar sample of a response that is collected according to a context of the response sample, and the context sample comprising a collected context of the response sample.

2. The method according to claim 1, wherein the dialog generation model comprises a recognition network and a first generator; and
    the performing the recognition according to the Gaussian mixture distribution comprises:
    invoking the recognition network to recognize a sum of the second latent variable and the first latent variable to obtain a first recognition result, and invoking the recognition network to recognize a sum of the third latent variable and the first latent variable to obtain a second recognition result, the first recognition result comprising a first Gaussian mixture distribution, and the second recognition result comprising a second Gaussian mixture distribution;
    invoking the recognition network to determine a posterior Gaussian noise from the first Gaussian mixture distribution and the second Gaussian mixture distribution; and
    invoking the first generator to convert the posterior Gaussian noise into the posterior latent variable.

3. The method according to claim 2, wherein the first recognition result further comprises a first weight, and the second recognition result further comprises a second weight; and
    the invoking the recognition network to determine the posterior Gaussian noise comprises:
    invoking the recognition network to acquire a first Gaussian noise from the first Gaussian mixture distribution, and invoking the recognition network to acquire a second Gaussian noise from the second Gaussian mixture distribution;
    multiplying the first Gaussian noise by the first weight to obtain a first product, and multiplying the second Gaussian noise by the second weight to obtain a second product; and
    determining a sum of the first product and the second product as the posterior Gaussian noise.

4. The method according to claim 1, wherein the dialog generation model comprises a prior network and a second generator; and
    the recognizing the first latent variable to obtain the prior latent variable comprises:
    invoking the prior network to recognize the first latent variable to obtain a third Gaussian mixture distribution and corresponding third weights, the third Gaussian mixture distribution comprising n third Gaussian noises;
    multiplying an $i^{th}$ third Gaussian noise by a corresponding $i^{th}$ third weight to obtain an $i^{th}$ third product, $0<i\leq n$, and determining a sum of n third products as a prior Gaussian noise; and
    invoking the second generator to convert the prior Gaussian noise into the prior latent variable, n being a positive integer greater than 2.

5. The method according to claim 4, wherein the prior network comprises a normalized exponential function; and
    the invoking the prior network to recognize the first latent variable to obtain the corresponding third weights comprises:
    invoking the normalized exponential function to process the first latent variable to obtain the corresponding third weights.

6. The method according to claim 1, wherein the dialog generation model comprises a posterior distribution module; and
    the method further comprises:
    invoking the dialog generation model to recognize the first latent variable, the second latent variable, and the third latent variable, and training a model parameter in the posterior distribution module according to a recognition result.

7. The method according to claim 6, wherein the posterior distribution module comprises a recognition network, a first generator, and a response decoder; and
    the invoking the dialog generation model comprises:
    invoking the recognition network to recognize a sum of latent variables to obtain a fourth Gaussian mixture distribution, and invoking the recognition network to acquire a fourth Gaussian noise from the fourth Gaussian mixture distribution;

invoking the first generator to process the fourth Gaussian noise to generate the posterior latent variable; and invoking the response decoder to decode a sum of the posterior latent variable and the first latent variable to train the model parameter in the posterior distribution module, the sum of the latent variables comprising the sum of the second latent variable and the first latent variable and the sum of the third latent variable and the first latent variable.

8. The method according to claim 1, wherein the dialog generation model comprises a posterior distribution module; and the method further comprises:

invoking the dialog generation model to recognize the first latent variable and the second latent variable, and training a model parameter in the posterior distribution module according to a recognition result.

9. A dialog generation method, performed by a server in which a dialog generation model is run, the dialog generation model being a model trained by using the method according to claim 1, the dialog generation method comprising:

acquiring a context of a dialog;

invoking the dialog generation model to encode the context of the dialog to obtain a first latent variable;

invoking the dialog generation model to recognize the first latent variable to obtain a prior latent variable;

invoking the dialog generation model to decode a sum of the first latent variable and the prior latent variable to generate a response dialog; and outputting the response dialog.

10. The method according to claim 9, wherein the dialog generation model comprises a prior network and a generator; and the invoking the dialog generation model comprises:

invoking the prior network to recognize the first latent variable to obtain a prior Gaussian noise; and invoking the generator to process the prior Gaussian noise to obtain the prior latent variable.

11. The method according to claim 10, wherein the prior network comprises a normalized exponential function; and the invoking the prior network comprises:

recognizing the first latent variable to obtain a third Gaussian mixture distribution, and invoking the normalized exponential function to determine third weights corresponding to the third Gaussian mixture distribution, the third Gaussian mixture distribution comprising n third Gaussian noises; and multiplying an $i^{th}$ third Gaussian noise by a corresponding $i^{th}$ third weight to obtain an $i^{th}$ third product, and determining a sum of n third products as the prior Gaussian noise, $0<i\leq n$, and n being a positive integer greater than 2.

12. An apparatus for training a dialog generation model, the apparatus comprising:

at least one memory configured to store program code; and at least one processor configured to read the program code and operate as instructed by the program code, the program code comprising:

acquisition code configured to cause the at least one processor to acquire at least one set of training samples, the training samples comprising a context sample, a response sample, and a response similar sample;

recognition code configured to cause the at least one processor to encode the context sample to obtain a first latent variable, and recognize the first latent variable to obtain a prior latent variable, the recognition code being configured to cause the at least one processor to encode the response sample to obtain a second latent variable, encode the response similar sample to obtain a third latent variable, and perform recognition according to a Gaussian mixture distribution of the first latent variable, the second latent variable, and the third latent variable to obtain a posterior latent variable; and matching code configured to cause the at least one processor to match the prior latent variable with the posterior latent variable, and perform adversarial training on the dialog generation model, the response similar sample being a similar sample of a response that is collected according to a context of the response sample, and the context sample being obtained by collecting the context of the response sample.

13. The apparatus according to claim 12, wherein the dialog generation model comprises a recognition network and a first generator; and the recognition code is configured to cause the at least one processor to perform the recognition according to the Gaussian mixture distribution by:

invoking the recognition network to recognize a sum of the second latent variable and the first latent variable to obtain a first recognition result, and invoke the recognition network to recognize a sum of the third latent variable and the first latent variable to obtain a second recognition result, the first recognition result comprising a first Gaussian mixture distribution, and the second recognition result comprising a second Gaussian mixture distribution;

invoking the recognition network to determine a posterior Gaussian noise from the first Gaussian mixture distribution and the second Gaussian mixture distribution; and invoking the first generator to convert the posterior Gaussian noise into the posterior latent variable.

14. The apparatus according to claim 13, wherein the first recognition result further comprises a first weight, and the second recognition result further comprises a second weight; and the recognition code is configured to cause the at least one processor to invoke the recognition network to determine the posterior Gaussian noise by:

invoking the recognition network to acquire a first Gaussian noise from the first Gaussian mixture distribution, and invoking the recognition network to acquire a second Gaussian noise from the second Gaussian mixture distribution;

multiplying the first Gaussian noise by the first weight to obtain a first product, and multiplying the second Gaussian noise by the second weight to obtain a second product; and determining a sum of the first product and the second product as the posterior Gaussian noise.

15. The apparatus according to claim 12, wherein the dialog generation model comprises a prior network and a second generator; and the recognition code is configured to cause the at least one processor to obtain the prior latent variable by:

invoking the prior network to recognize the first latent variable to obtain a third Gaussian mixture distribution and corresponding third weights, the third Gaussian mixture distribution comprising n third Gaussian noises;

multiplying an $i^{th}$ third Gaussian noise by a corresponding $i^{th}$ third weight to obtain an $i^{th}$ third product, $0<i\leq n$, and determining a sum of n third products as a prior Gaussian noise; and invoking the second generator to convert the prior Gaussian noise into the prior latent variable, n being a positive integer greater than 2.

16. The apparatus according to claim 15, wherein the prior network comprises a normalized exponential function; and the recognition code is configured to cause the at least one processor to obtain the corresponding third weights by invoking the normalized exponential function to process the first latent variable to obtain the corresponding third weights.

17. The apparatus according to claim 12, wherein the dialog generation model comprises a posterior distribution module; and the program code further comprises training code configured to cause the at least one processor to invoke the dialog generation model to recognize the first latent variable, the second latent variable, and the third latent variable, and train a model parameter in the posterior distribution module according to a recognition result.

18. A dialog generation apparatus, configured to run the dialog generation model trained by the apparatus according to claim 12, the dialog generation apparatus comprising:

at least one memory configured to store program code; and at least one processor configured to read the program code and operate as instructed by the program code, the program code comprising:

context acquisition code configured to cause the at least one processor to acquire a context of a dialog;

invoking code configured to cause the at least one processor to invoke the dialog generation model to encode the context of the dialog to obtain a first latent variable, the invoking code being configured to cause the at least one processor to invoke the dialog generation model to recognize the first latent variable to obtain a prior latent variable; and the invoking code being configured to cause the at least one processor to invoke the dialog generation model to decode a sum of the first latent variable and the prior latent variable to generate a response dialog; and an output module, configured to output the response dialog.

19. A computer device, comprising:

a memory; and a processor, connected to the memory, the processor being configured to load and execute executable instructions to implement the method for training a dialog generation model according to claim 1.

20. A non-transitory computer-readable storage medium, storing at least one instruction, at least one program, a code set, or an instruction set, the at least one instruction, the at least one program, the code set, or the instruction set being loaded and executed by a processor to implement the method for training a dialog generation model according to claim 1.

* * * * *